United States Patent
Choi

(10) Patent No.: US 7,158,794 B2
(45) Date of Patent: Jan. 2, 2007

(54) FORWARD CHANNEL SCHEDULING ALGORITHM OF HDR SYSTEM

(75) Inventor: Young-Jin Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 10/843,561

(22) Filed: May 12, 2004

(65) Prior Publication Data

US 2004/0235488 A1 Nov. 25, 2004

(30) Foreign Application Priority Data

May 20, 2003 (KR) ........................ 10-2003-0032042

(51) Int. Cl.
*H04Q 7/20* (2006.01)
(52) U.S. Cl. .................. 455/452.2; 455/512; 455/517; 370/442; 370/395.42; 370/444
(58) Field of Classification Search ................ 455/512, 455/517, 452.2; 370/395.42, 442, 444, 395.4
See application file for complete search history.

(56) References Cited

U.S. PATENT DOCUMENTS

| | | | |
|---|---|---|---|
| 6,335,922 B1* | 1/2002 | Tiedemann et al. | 370/335 |
| 6,657,980 B1* | 12/2003 | Holtzman et al. | 370/329 |
| 6,788,687 B1* | 9/2004 | Bao et al. | 370/394 |
| 6,807,426 B1* | 10/2004 | Pankaj | 455/453 |
| 6,847,629 B1* | 1/2005 | Razoumov et al. | 370/349 |
| 6,889,056 B1* | 5/2005 | Shibutani | 455/522 |
| 6,925,057 B1* | 8/2005 | Cheng et al. | 370/235 |
| 2002/0067694 A1* | 6/2002 | Cheng et al. | 370/230 |
| 2002/0071446 A1* | 6/2002 | Khafizov et al. | 370/442 |

FOREIGN PATENT DOCUMENTS

| | | |
|---|---|---|
| CN | 1396778 A | 2/2003 |
| KR | 2002-0064985 | 8/2002 |

OTHER PUBLICATIONS

Chinese Office Action dated Mar. 24, 2006 issued in Chinese Patent Application No. 200410045877.9.

* cited by examiner

*Primary Examiner*—Lester G. Kincaid
*Assistant Examiner*—Nicholas La
(74) *Attorney, Agent, or Firm*—Fleshner & Kim LLP.

(57) ABSTRACT

A system and method for performing forward channel scheduling for an HDR system includes collecting status information of connected terminals, calculating a predetermined weight ($\alpha(n)$), calculating priority values of respective terminals based on the collected status information and the weight ($\alpha(n)$), and selecting a terminal having the highest priority value and providing the selected terminal with the service. By considering the number of connected mobile terminals, disadvantages of other proposed scheduling algorithms are overcome. Also, the entire throughput of the HDR system is improved by maintaining Quality of Service (QoS) of the mobile terminals that require the real-time service.

15 Claims, 3 Drawing Sheets

FORWARD CHANNEL SCHEDULING ALGORITHM OF HDR SYSTEM

BACKGROUND OF THE INVENTION

1. Field of the Invention

The present invention generally relates to the high data rate (HDR) system, and particularly, to a forward channel scheduling algorithm realized in an HDR system.

2. Background of the Related Art

A high data rate (HDR) system is a third-generation mobile communication system for providing a high-rate packet data service, excluding real-time voice service. Some trials for providing real-time services such as video telephone and VOD have been attempted on HDR systems currently in use, and some service providers are actually providing VOD service on HDR systems already.

A forward channel of the HDR system uses a time division multiple access (TDMA) method. The TDMA method divides time into predetermined intervals (slots), and allots each slot to mobile terminals to provide a plurality of mobile terminals with services. At that time, a base station uses a scheduling algorithm to select the mobile terminal to be served at each respective slot. The HDR system obtains data rate control (DRC) information from the mobile terminal which is presently served, and uses the above information for the scheduling algorithm. The DRC information is a parameter representing the data transmission rate that can be served to the mobile terminal from the base station through the forward channel.

VOD or video phone services should be provided in teal-time, unlike general data services which are not limited to time. In addition, VOD and video phone services should be ensured for high Quality of Service (QoS) from the HDR system. Representative QoS parameters include maximum allowable time delay (T) and packet loss tolerance probability ($\delta$). Maximum allowable time delay (T) means the delayed time that is allowed in transmitting packets, and packet loss tolerance probability ($\delta$) is the probability that a packet is allowed to be lost.

Packet loss mainly occurs when the packet transmission time is longer than the maximum allowable time delay (T), or occurs due to radio channel error. In the case of voice telephoning, the maximum allowable time delay is about 25 ms, and the packet loss tolerance probability is $10^{-3}$. In the case of video telephones, the time delay is allowed to be hundreds of ms, however the packet loss tolerance probability is about $10^{-5}$.

On the other hand, general data services such as web service or e-mail service allows for a time delay of about a few seconds to tens of seconds. However, the packet loss tolerance probability is very small, that is, about $10^{-9}$.

HDR systems which provide the aforementioned services require an effective scheduling algorithm in order to improve the throughput of the system and to therefore maintain a certain service quality of each user.

FIG. 1 is a flow chart showing a related-art scheduling algorithm, and Equation (1) is an equation for calculating priority (P) according to the related-art algorithm.

$$P_j = (-\log \delta_i) \times \frac{D_i(t)}{\overline{D_i}(t)} \times \frac{W_i(t)}{T_i} \quad (1)$$

In Equation (1), $T_i$ is the maximum allowable time delay of a mobile terminal i, and $\delta_i$ is the probability of tolerating violation in the time delay ($T_i$).

A control unit which performs the related-art scheduling algorithm receives DRC information in every slot from all mobile terminals (S10). DRC information received from mobile terminal i is represented as $D_i(t)$. Based on the received DRC information, the average data transmission rate ($\overline{D_i}(t)$) is calculated (S11). In FIG. 1, $D^*_i(t)$ is the data transmission rate of mobile terminal i in slot t, and the $\overline{D_i}(t)$ is the average packet transmission rates from the first slot to $(t-1)^{th}$ slot. Next, the delayed time $W_i(t)$ of the first packet in the queue dedicated to the mobile terminal i is calculated (S12). The first packet of the queue is the packet having the longest delayed time, and the delayed time can be obtained by calculating the difference between the present time and the arrival time of the packet.

As described above, when the components required in Equation (1) are all obtained, the control unit uses Equation (1) to calculate the priority values of the respective mobile terminals (S13). More specifically, Equation (1) multiplies the inverse proportion component ($-\log \delta_i$) of the time delay violation tolerance probability $\delta_i$, a comparative component ($D_i(t)/\overline{D_i}(t)$) of the average data transmission rate and the DRC information of the corresponding mobile terminal, and the comparative component ($W_i(t)/T_i$) between the maximum allowable time delay $T_i$ of the packet and the present delayed time $W_i(t)$.

When the priority values of the respective mobile terminals are obtained, the control unit serves the packets of the mobile terminal having the highest priority (S14).

In view of the first component ($-\log \delta_i$) of Equation (1), the priority of the terminal increases as the $\delta_i$ becomes smaller; thus, P is inversely proportional with $\delta_i$. Also, the first component ($-\log \delta_i$) maintains balance of the time delay violation tolerance probability $\delta_i$. That is, if it is assumed that values of the second component ($D_i(t)/\overline{D_i}(t)$) and the third component ($W_i(t)/T_i$) are fixed, the priority value of the corresponding mobile terminal is increased and the time delay violation is lowered as the $\delta$ becomes smaller, and therefore, the QoS of the user can be satisfied.

The second component ($D_i(t)/\overline{D_i}(t)$) in the Equation (1) affects the decision of service priority value, by comparing the DRC information representing the radio channel status to the served average data rate. That is, the service is frequently provided to the mobile terminal having a radio channel which is in good condition, to improve the entire throughput of the HDR system.

The third component ($W_i(t)/T_i$) of Equation (1) affects the decision of service priority value, by comparing the maximum allowable time delay $T_i$ of the packet and the presently delayed time $W_i(t)$. That is, higher priority is provided to the packet of the mobile terminal having a long presently delayed time $W_i(t)$ (or the packet having relatively longer delayed time).

As described above, the related-art scheduling algorithm provides service to the mobile terminal having a small time delay violation tolerance probability ($\delta$), to the mobile terminal having a radio channel of higher condition than that of the average service rate and to the mobile terminal suffering relatively long time delay.

A significant disadvantage of the related-art scheduling algorithm is that it does not consider the number of mobile terminals connected to the HDR system. In the related-art algorithm, the first component ($-\log \delta_i$) and the third component ($W_i(t)/T_i$) are related to service quality, and they are determined independently of the number of mobile terminals. But, the second component ($D_i(t)/\overline{D_i}(t)$) is affected by the number of mobile terminals. $D_i(t)$ is the value affected by the property of radio channel, and is not changed according to the number of mobile terminals. However, $\overline{D_i}(t)$ is reduced as the number of mobile terminals is increased, because a lot of mobile terminals share the limited bandwidth of the system.

Consequently, in the related-art algorithm, when the number of mobile terminals increases, the effect of the first component ($-\log \delta_i$) and the third component ($W_i(t)/T_i$) is reduced since the second component ($D_i(t), \overline{D_i}(t)$) becomes more dominant than the other two components in Equation (1). This means that the first and third components have little effect on the determination of the mobile terminal whose packet will be served in the next time slot. As a result, the QoS requirements of the mobile terminals cannot be satisfied.

SUMMARY OF THE INVENTION

An object of the invention is to solve at least the above problems and/or disadvantages and to provide at least the advantages described hereinafter.

Another object of the present invention is to provide a forward channel scheduling algorithm for an HDR system, which allows service priority to be decided by considering the number of mobile terminals in the system.

Another object of the present invention is to provide a forward channel scheduling algorithm for an HDR system, which allows the entire throughput of the HDR system to be improved by maintaining QoS of the mobile terminals.

To achieve these and other objects and advantages of the present invention, as embodied and broadly described herein, there is provided a forward channel scheduling algorithm for an HDR system, which comprises collecting status information of connected terminals, and calculating a predetermined weight value ($\alpha(n)$) which is in proportion to the number of connected terminals; calculating priority values of the respective terminals based on the collected status information and the weight value; and selecting the terminal having the highest priority and providing the selected terminal with the service.

Desirably, the status information comprises: data rate control (DRC) information ($D_i(t)$); average data transmission rate ($\overline{D_i}(t)$) of the terminals; delayed time ($W_i(t)$) of the first packet in the queue dedicated to each terminal; maximum allowable delay time ($T_i$) of the packet; and tolerance probability ($\delta_i$) of violating the time delay ($T_i$).

Preferably, the priority value is obtained by multiplying: inverse proportion component ($-\log \delta_i$) of the tolerance probability ($\delta_i$); component ($D_i(t)/\overline{D_i}(t)$) calculated by dividing the DRC information of the corresponding terminal by the average data transmission rate; and exponential function having a value $$\left(\alpha(n) \times \frac{W_i(t)}{T_i}\right)$$

obtained by multiplying the component calculated by dividing the delayed time ($W_i(t)$) of the first packet by the maximum allowable time delay ($T_i$) with the weight value as the exponential value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
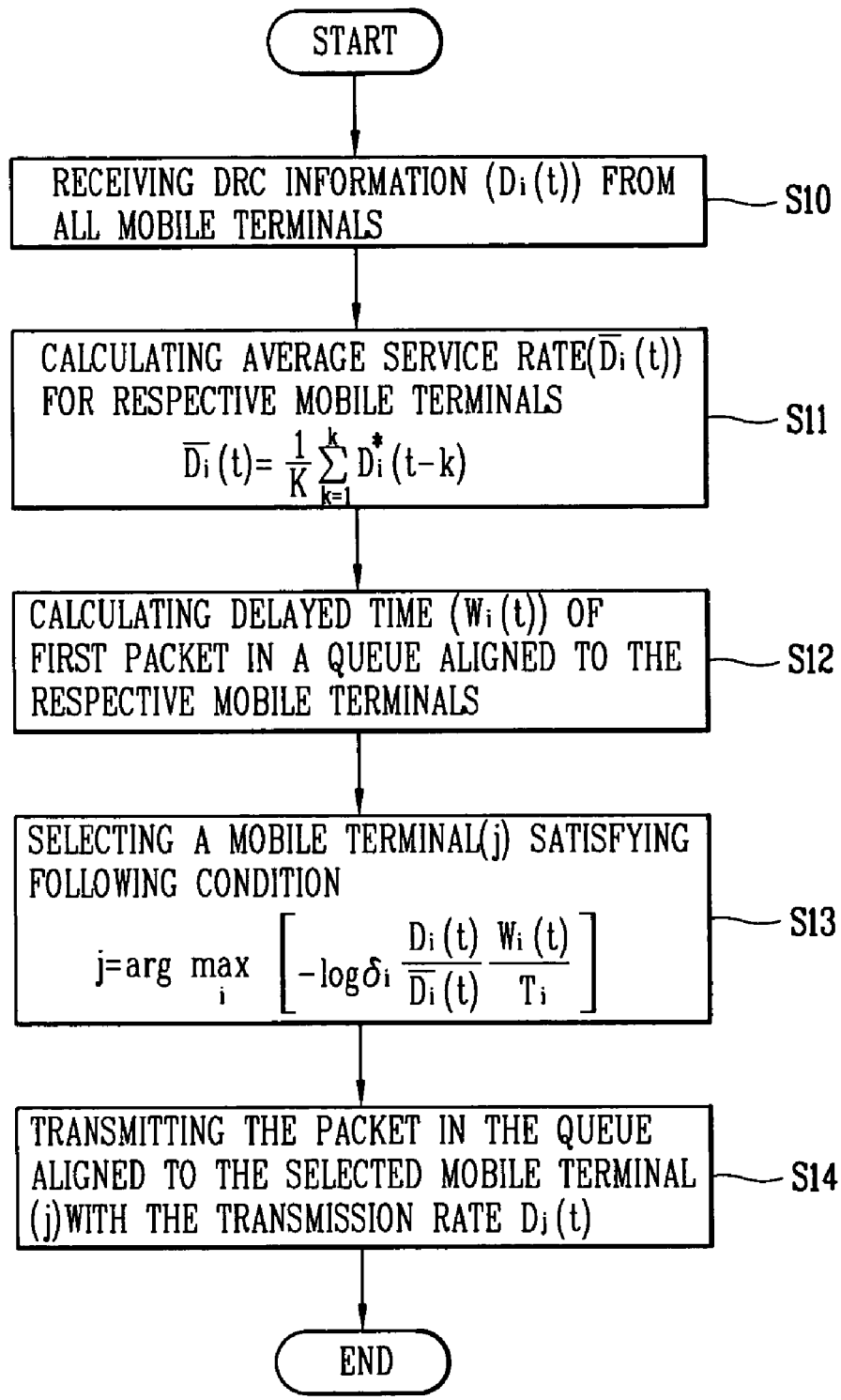
FIG. 1 is a flow chart illustrating a related-art scheduling algorithm.
Figure 2:
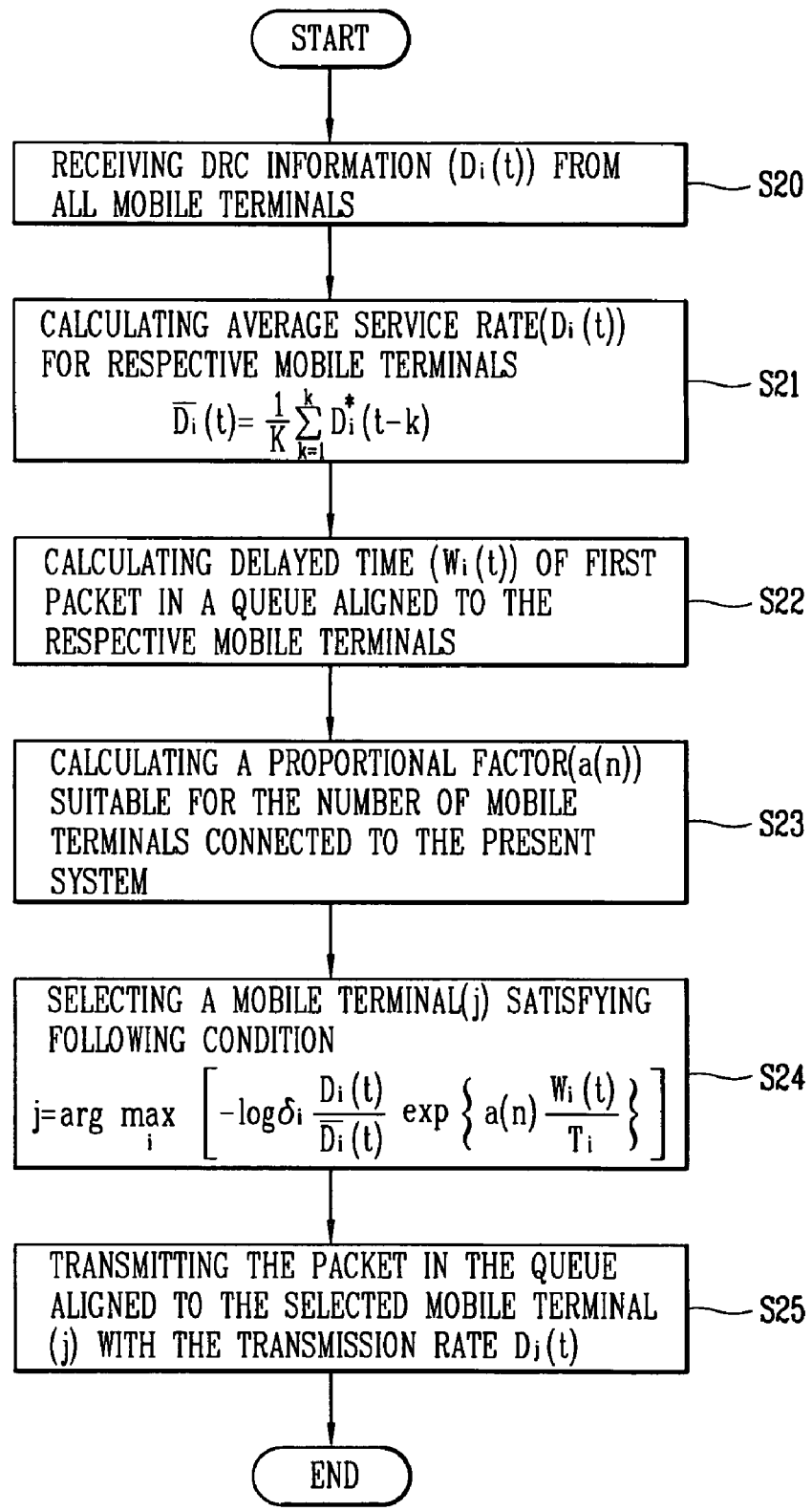
FIG. 2 is a flow chart illustrating a scheduling algorithm according to one embodiment of the present invention.
Figure 3:
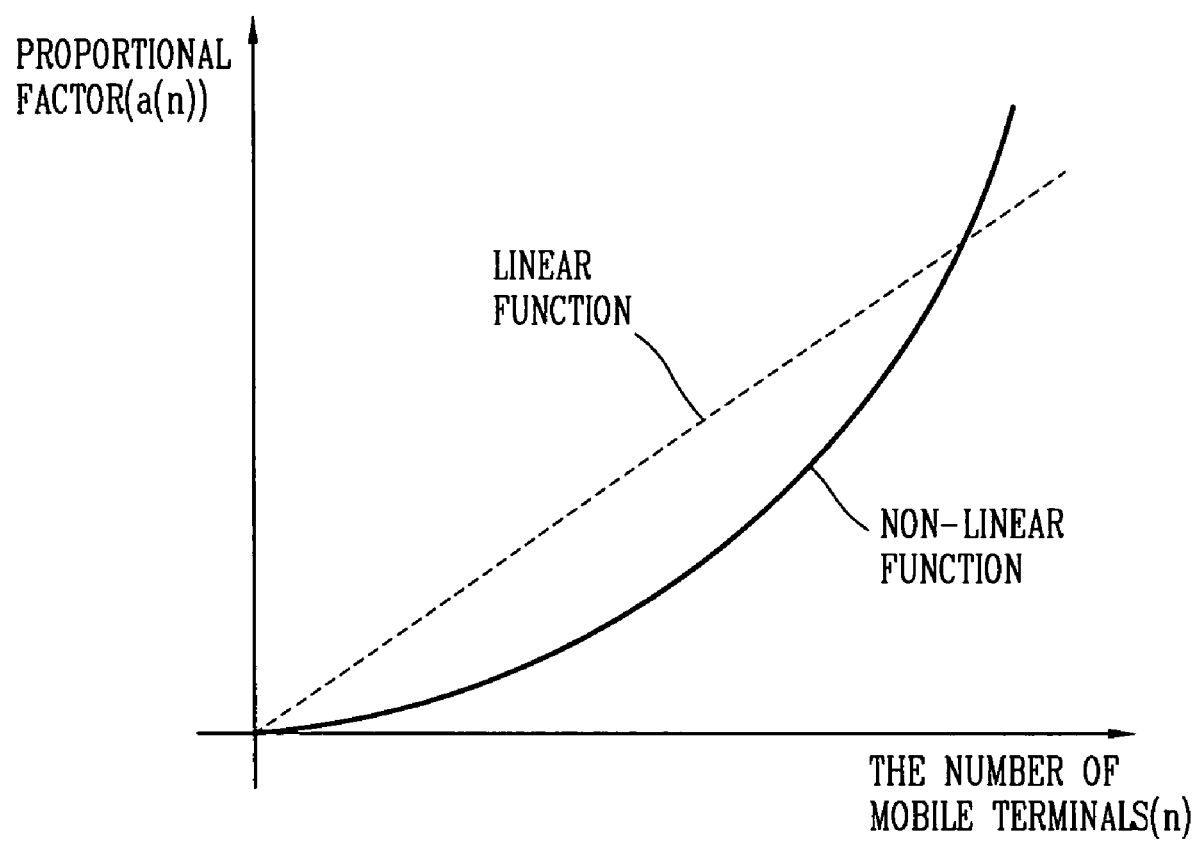
FIG. 3 is a graph showing a correlation between the number of mobile terminals and proportional factor ($\alpha(n)$) in accordance with the present invention.

FIG. 2 shows steps included in a scheduling algorithm according to one embodiment of the present invention, and FIG. 3 is a graph showing some possible relations between the number of mobile terminals and the proportional factor ($\alpha(n)$) explained in greater detail below.

As shown in FIG. 2, the scheduling algorithm includes collecting status information of connected terminals and calculating a predetermined weight ($\alpha(n)$) which is proportional to the number of connected terminals (S20–S23) calculating priority values of the respective terminals based on the collected status information and the weight ($\alpha(n)$) (S24), and selecting a terminal having the highest priority value and providing the selected terminal with service (S25).

Equation (2) is an equation for calculating the priority (P) value in the scheduling algorithm according to the present invention.

$$P_j = (-\log \delta_i) \times \frac{D_i(t)}{\overline{D_i}(t)} \times \exp\left(\alpha(n) \times \frac{W_i(t)}{T_i}\right) \quad (2)$$

In this equation, $T_i$ represents the maximum allowable delay time of mobile terminal i requiring real-time service, $\delta_i$ represents the tolerance probability of violating the time delay $T_i$, and $\alpha(n)$ represents the proportional factor. The scheduling algorithm will not be described in detail as follows.

A control unit receives the DRC information $D_i(t)$ from a predetermined number and preferably all mobile terminals at every time slot (S20). Based on the received DRC information ($D_i(t)$), average data transmission rate $\overline{D_i}(t)$ and the packet delayed time $W_i(t)$ are calculated using the same method as that of the related-art previously discussed. However, if desired, other methods for calculating these parameters may be used.

After the $\overline{D_i}(t)$ and $W_i(t)$ are calculated, the control unit calculates the proportional factor (or weight) $\alpha(n)$ that depends on the number of mobile terminals in the system (S23). This proportional factor $\alpha(n)$ is preferably a monotone increasing function with respect to the number of connected mobile terminals, and increases in proportion to the number of connected mobile terminals. The control unit multiplies $\alpha(n)$ by the third component ($W_i(t)/T_i$, relative time delay) in Equation (1). The above two components are multiplied in order for the $W_i(t)/T_i$ to affect toward the decision of service priority as well as the $D_i(t)/\overline{D_i}(t)$.

As described above, when the components required to calculate priority (Equation 2) are all obtained, the control unit uses Equation (2) to calculate the priority values of the respective mobile terminals (S23). As shown in Equation 2, the priority value according to the present invention is preferably obtained by multiplying the inverse proportion component ($-\log \delta_i$) of the time delay violation tolerance probability $\delta_i$, the component ($D_i(t)/\overline{D_i}(t)$) comparing the average data transmission rate and the DRC information of the corresponding terminal, and an exponential function having an exponential value of $$\alpha(n) \times \frac{W_i(t)}{T_i}.$$

Preferably, an exponential function is used which converges toward 1 when the exponential value becomes smaller, and diverges when the exponential value becomes larger.

When the priority values of the respective terminals are obtained, the control unit provides the mobile terminal having the highest priority value with the packet service. At that time, the packet service is performed according to the data rate informed by the DRC of the corresponding terminal.

According to the present invention, Equation (2) differs from the related-art algorithm in that it multiplies the relative time delay component ($W_i(t)/T_i$) by the proportional factor $\alpha(n)$ and in granting the exponential function feature to the above component $$\left(\alpha(n) \times \frac{W_i(t)}{T_i}\right).$$

First, if the relative time delay component ($W_i(t)/T_i$) is multiplied by the proportional factor $\alpha(n)$, the effect of the relative time delay component ($W_i(t)/T_i$) is also increased, as well as the second component ($D_i(t)/\overline{D_i}(t)$), when the number of mobile terminals is increased. As a result, the time delay requirement (QoS) of the respective mobile terminal is satisfied.

Second, when the relative time delay component ($W_i(t)/T_i$) has the exponential function features, the service priority value is not largely changed by the decrease of the $W_i(t)/T_i$. However, the service priority value is changed a lot by the increase of $W_i(t)/T_i$ (it is assumed that the number of mobile terminals is constant).

More specifically, in the case where $W_i(t)/T_I$ is decreased (that is, the packets in the queue satisfies with the time delay requirements), the component related to the quality of service $$\left(\exp\left(\alpha(n) \times \frac{W_i(t)}{T_i}\right)\right)$$

converges toward 1. Therefore, the component related to the throughput of the HDR system ($D_i(t)/\overline{D_i}(t)$) affects definitely the service priority value rather than the component related to the service quality $$\left(\exp\left(\alpha(n) \times \frac{W_i(t)}{T_i}\right)\right).$$

On the contrary, in the case where the ($W_i(t)/T_i$) is increased (that is, in case that the packets in the queue cannot satisfy with the time delay requirements), the component related to the service quality $$\left(\exp\left(\alpha(n) \times \frac{W_i(t)}{T_i}\right)\right)$$

affects the service priority value.

In other words, when the QoS of the HDR system is in the level required by the mobile terminal, the present invention provides the service in order to improve the entire throughput of the HDR system. And, the QoS of the HDR system is under the level required by the mobile terminal, the present invention provides the service in order to satisfy the QoS requirements of the mobile terminals.

According to the scheduling algorithm of the present invention, the disadvantage of the related-art scheduling algorithm that the number of connected mobile terminals is not considered can be improved, and the entire throughput of the HDR system can be improved by maintaining the QoS of the mobile terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A forward channel scheduling method for a high data rate (HDR) system, comprising:
    collecting status information of connected terminals;
    calculating a proportional factor ($\alpha(n)$) based on a number of the connected terminals, the proportional factor based on a monotone increasing function having the number of connected mobile terminals as an input value, the function increasing or decreasing in proportion to the number of connected mobile terminals;
    calculating respective priority values for the connected terminals based on the collected status information and the proportional factor ($\alpha(n)$); and
    selecting a terminal having a highest priority value and providing the selected terminal with service, wherein each of the priority values is calculated based on a product of the proportional factor and a relative time delay component.

2. The method of claim 1, wherein the status information comprises:
    data rate control (DRC) information ($D_i(t)$);
    average data transmission rate ($\overline{D_i}(t)$) of the terminals calculated based on the DRC information;
    delayed time of first packet ($W_i(t)$) in a queue aligned to the respective mobile terminal;
    maximum allowable time delay of the packet ($T_i$); and
    tolerance probability ($\delta_i$) of violating the time delay ($T_i$).

3. The method of claim 1, wherein the selected terminal is provided with service according to a data rate required by a DRC of the terminal.

4. A forward channeling scheduling method for a high data rate (HDR) system, comprising:
    collecting status information of connected terminals;

calculating a proportional factor ($\alpha(n)$) based on a number of the connected terminals;

calculating respective priority values for the connected terminals based on the collected status information and the proportional factor ($\alpha(n)$); and selecting a terminal having a highest priority value and providing the selected terminal with service, wherein an equation for calculating each of the priority values includes an exponential function of the product of the proportional factor and a relative time delay component.

5. A forward channel scheduling method for a high data rate (HDR) system, comprising:

collecting status information of connected terminals;

calculating a proportional factor ($\alpha(n)$) based on a number of the connected terminals;

calculating respective priority values for the connected terminals based on the collected status information and the proportional factor ($\alpha(n)$); and selecting a terminal having a highest priority value and providing the selected terminal with service, wherein each of the priority values are obtained by multiplying:

an inverse proportion component ($-\log \delta_i$) of a time delay violation tolerance probability $\delta_i$;

a component calculated by dividing DRC information of corresponding terminal by average data transmission rate ($D_i(t) /\overline{D_i}(t)$); and an exponential function having an exponential value $$\left(\alpha(n) \times \frac{W_i(t)}{T_i}\right)$$

based on multiplying the relative time delay component, obtained by dividing the delayed time of first packet ($W_i(t)$) by maximum allowable time delay ($T_i$) of the packet, with the proportional factor.

6. The method of claim 1, wherein the relative time delay component is based on dividing a delayed time of a packet ($W_i(t)$) by a maximum allowable time delay ($T_i$) of the packet.

7. The method of claim 1, wherein the proportional factor is a predetermined weight.

8. A forward channel scheduling method for a high data rate (HDR) system, comprising:

collecting status information of connected terminals;

calculating a proportional factor ($\alpha(n)$) based on a number of the connected terminals;

calculating respective priority values for the connected terminals based on the collected status information and the proportional factor ($\alpha(n)$); and selecting a terminal having a highest priority value and providing the selected terminal with service, wherein each of the priority values is computed based on the following equation:

$$P_j = (-\log\delta_i) \times \frac{D_i(t)}{\overline{D_i}(t)} \times \exp\left(\alpha(n) \times \frac{W_i(t)}{T_i}\right),$$

where $D_i(t)$ corresponds to data rate control information, $\overline{D_i}(t)$ corresponds to average data transmission rate of the terminals calculated based on the data rate control information, $W_i(t)$ is a delayed time of a packet in a queue aligned to the respective mobile terminal, ($T_i$) is a maximum allowable time delay of the packet, and ($\delta_i$) is a tolerance probability of violating the time delay.

9. A forward channel scheduling method for a high data rate (HDR) system, comprising:

collecting status information of connected terminals;

calculating a proportional factor based on a number of the connected terminals, the proportional factor based on a monotone increasing function having the number of connected mobile terminals as an input value, the function increasing or decreasing in proportion to the number of connected mobile terminals;

calculating respective priority values for the connected terminals based on the collected status information and the proportional factor; and selecting a terminal having a highest priority value and providing the selected terminal with service, the status information including:

data rate control (DRC) information ($D_i(t)$);

average data transmission rate $\overline{D_i}(t)$) of the terminals calculated based on the DRC information;

delayed time of a packet ($W_i(t)$) in a queue aligned to the respective mobile terminal;

maximum allowable time delay of the packet ($T_i$); and tolerance probability ($\delta_i$) of violating the time delay ($T_i$).

10. The method of claim 9, wherein the packet is a first packet in the queue aligned to the respective mobile terminal.

11. The method of claim 9, wherein the relative time delay component is based on the maximum allowable time delay of the packet and the delayed time of the packet.

12. The method of claim 9, wherein an equation for calculating each of the priority values includes an exponential function of the product of the proportional factor and a relative time delay component.

13. The method of claim 9, wherein each of the priority values is obtained by multiplying:

an inverse proportion component ($-\log \delta_i$) of the time delay violation tolerance probability $\delta_i$;

a component calculated by dividing the DRC information of corresponding terminal by average data transmission rate ($D_i(t) /\overline{D_i}(t)$); and an exponential function having an exponential value $$\left(\alpha(n) \times \frac{W_i(t)}{T_i}\right)$$

based on multiplying the relative time delay component, obtained by dividing the delayed time of the packet ($W_i(t)$) by the maximum allowable time delay ($T_i$) of the packet, with the proportional factor.

14. The method of claim 9, wherein the proportional factor is a predetermined weight.

15. The method of claim 9, wherein each of the priority values is computed based on the following equation:

$$P_j = (-\log\delta_i) \times \frac{D_i(t)}{\overline{D_i}(t)} \times \exp\left(\alpha(n) \times \frac{W_i(t)}{T_i}\right).$$

* * * * *